(No Model.)

H. D. CUSHMAN.
INHALER.

No. 488,427. Patented Dec. 20, 1892.

Witnesses
Louis G. Julihn
Eric G. Julihn

Inventor
H. D. Cushman
By Hopkins & Atkins
Attorneys

UNITED STATES PATENT OFFICE.

HENRY D. CUSHMAN, OF THREE RIVERS, MICHIGAN.

INHALER.

SPECIFICATION forming part of Letters Patent No. 488,427, dated December 20, 1892.

Application filed February 2, 1892. Renewed November 17, 1892. Serial No. 452,295. (No model.)

*To all whom it may concern:*

Be it known that I, HENRY D. CUSHMAN, of Three Rivers, county of St. Joseph, and State of Michigan, have invented certain new and useful Improvements in Inhalers, of which the following is a specification, reference being had to the accompanying drawings.

My improvements relate particularly to the class of inhalers known as "menthol inhalers," in which crystalline menthol is the medicament used.

The object of my invention is to provide an inhaler of simple construction that can be conveniently opened for use and readily closed when not in use to prevent volatilization and escape of the menthol.

My invention relates to menthol inhalers of the kind in which a rotating screw-threaded sleeve is employed, and in which, by the rotation of the sleeve, the casing is opened or closed at will at both ends, so that when open air will pass through from end to end and carry the menthol to be inhaled in the usual way, and when closed the menthol will be protected.

Figure 1:
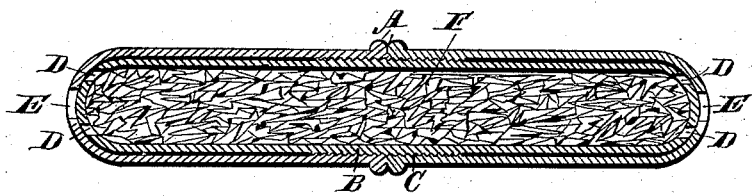
Figure 2:
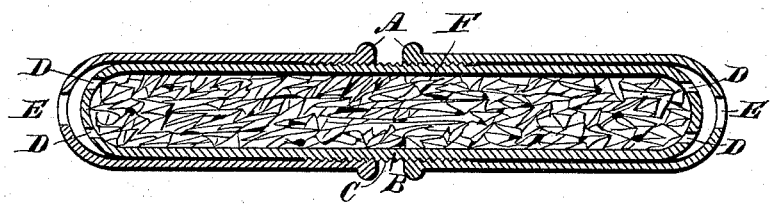

Referring to the accompanying drawings, Figure 1 is a longitudinal section of my improved inhaler, in which the screw is located in the center of the device. In this figure the inhaler is shown with its ends closed. Fig. 2 is similar to Fig. 1, except that the divided sleeve is shown unscrewed so as to open the ends of the inhaler to make it ready for use.

Referring to the letters upon the drawings, the divided or double sleeve A is shown as outside of the casing B, so that by rotating each part of it, it will be unscrewed and separated from the ends of the casing, so as to open them and admit air to pass through the inhaler.

C indicates the screw threads, and D indicates a casing open at both ends, as is also the divided sleeve.

E E indicates the contents of the casing. When the two parts of the sleeve are screwed together, as shown in Fig. 1, the openings in the sleeve and casing will be closed, and when they are screwed apart, as shown in Fig. 2, all the end apertures of the sleeve and the casing will be open.

What I claim is:

The combination with a centrally screw-threaded casing open at both ends, of a divided sleeve correspondingly screw-threaded and open at both ends and adapted to have its parts rotated so as to simultaneously open the apertures in the casing and the parts of the sleeve, substantially as set forth.

In testimony of all which I have hereunto subscribed my name.

HENRY D. CUSHMAN.

Witnesses:
GEO. E. MILLER,
GEO. SHANK.